United States Patent Office 3,421,076
Patented Jan. 7, 1969

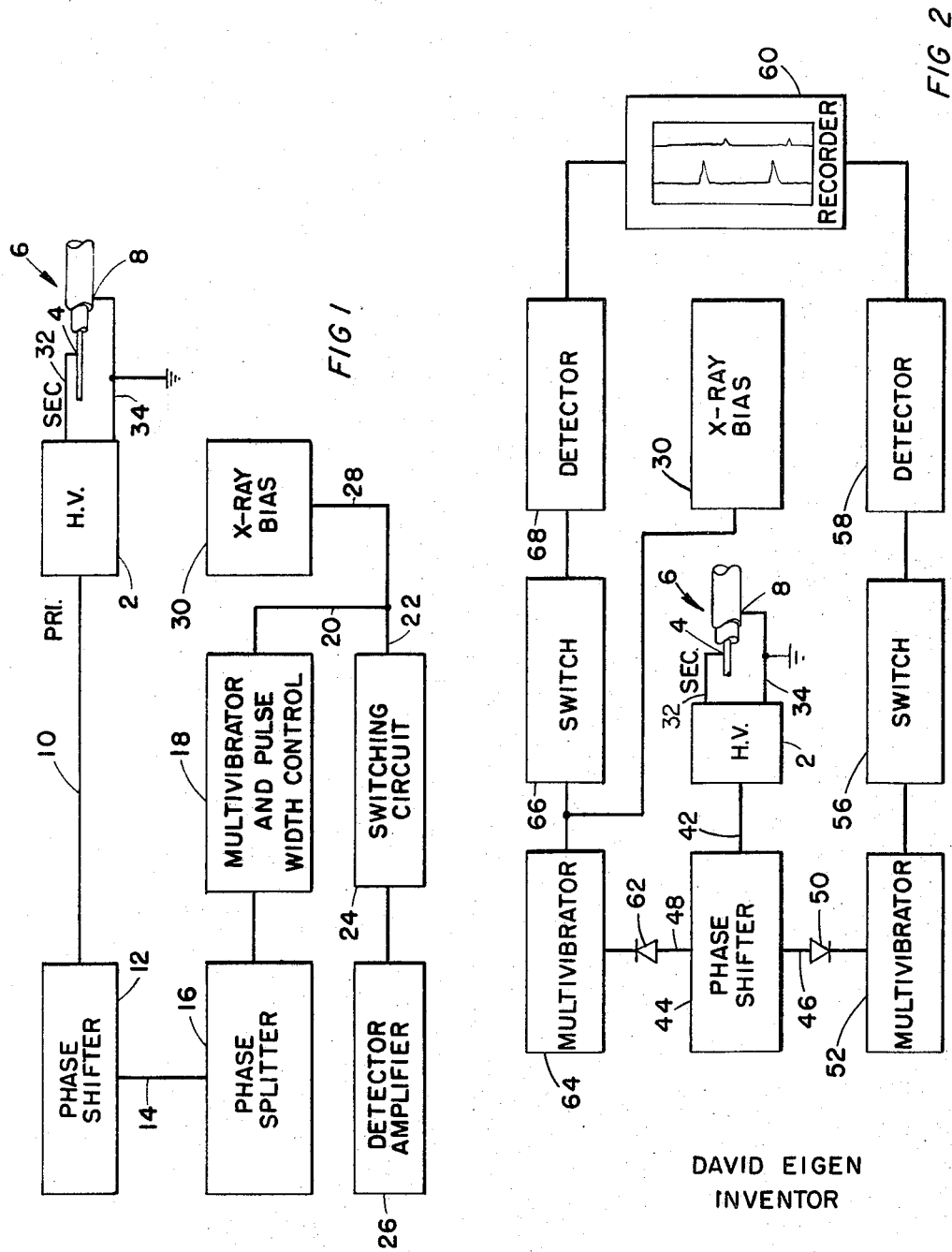

3,421,076
CABLE SCANNING METHOD AND APPARATUS WHEREIN CORONA DISCHARGE IS DETECTED ONLY AT APPROXIMATELY PEAK VALUES OF AN APPLIED VOLTAGE
David Eigen, Passaic, N.J., assignor to The Okonite Company, Passaic, N.J., a corporation of Delaware
Filed Oct. 3, 1966, Ser. No. 583,747
U.S. Cl. 324—54  19 Claims
Int. Cl. G01r *31/12*

ABSTRACT OF THE DISCLOSURE

The invention relates to a cable inspection method and apparatus wherein an alternating voltage is applied to the cable to cause ionization to occur in any dielectric discontinuities within the cable insulation. A corona discharge detector is synchronized with the applied alternating volage so that the detector is is operable to detect any corona discharge in the cable insulation only during intervals when the alternating voltage is approximately at a peak value.

---

This invention relates to inspection of electric cable and is particularly directed to methods and apparatus for detecting dielectric discontinuities contained in the insulation of electric cable.

In the manufacture of electric cable, it is possible for dielectric discontinuities, such as gas cells or foreign matter, to occur in the insulation of the cable. Since these dielectric discontinuities are potential soures of cable failure, it is preferably to detect and remove portions of the cable containing such discontinuities during manufacture, rather than after the cable has been installed. One prior art inspection technique for detecting such discontinuities calls for applying an alternating voltage between a conductor within the cable and an external electrode at a magnitude sufficient to cause corona discharge to occur within the discontinuities, and detecting any resulting corona discharge. However, the size of the discontinuties which can be detected by this technique is inversely related to the magnitude of the applied voltage. Unfortunately, the magnitudes of the voltages required to effectively perform this technique often border on the breakdown value of the cable insulation with the result that destruction of the cable sometimes occurs. Moreover, in the absence of actual destruction, the insulation of the cable may become permanently strained. This condition is undetectable, but results in premature failure of the cable after it has been installed. An alternative technique is disclosed in my copending application, Ser. No. 573,904, filed Aug. 22, 1966, entitled "Cable Scanning Method and Apparatus." This technique calls for applying a stressing voltage, in substantially the manner discussed above, but at a magnitude which is sufficient to cause ionization to occur in the discontinuities, yet is below the corona inception level. While the cable is thus stressed, it is periodically irradiated with bursts of highly penetrating radiation, such as X-rays, which cause discharge of the ionization and emission of corona discharge. This technique is advantageous in that lower stressing voltages are employed so that destruction or permanent straining of the cable is less likely. Although these prior art techniques are of considerable value, both are subject to the disadvantage that operation of electrical equipment, sparking, and other electrical phenomena occurring in the vicinity of the inspection operation induce electrical signals in the cable. These induced signals have been detected by the corona detection apparatus of the prior art techniques and have constituted electrical "noise" which has tended to obscure the corona signals.

These disadvantages of the prior art are overcome with the present invention and methods and apparatus for cable inspection are provided which greatly improve and signal-to-noise ratio of the prior-art cable inspection techniques. Moreover, the methods and apparatus of the present invention are compatible with these of the prior art. Consequently, existing apparatus can readily be modified to provide the advantages of the present invention. Moreover, the technique of the present invention makes it possible to obtain information which has not been available with the techniques of the prior art.

The advantages of the present invention are preferably attained by synchronizing the corona detector with the stressing voltage and allowing the detector to be operative only during brief intervals when corona discharge is most likely to occur.

Accordingly, it is an object of the present invention to provide improved methods and apparatus for inspecting electric cable.

Another object of the present invention is to provide methods and apparatus for improving the signal-to-noise ratio of cable inspection equipment.

A further object of the present invention is to provide methods and apparatus for cable inspection which yield information that has not been obtainable with prior-art cable inspection techniques.

A specific object of the present invention is to provide methods and apparatus for applying an alternating voltage to stress a cable which is to be inspected and activating a detector during brief intervals synchronized with the stressing voltage to detect cornor discharge occurring in the cable.

These and other objects and features of the present invention will be apparent from the following detailing specification and claims taken with reference to the accompanying drawing.

In the drawing:

FIGURE 1 is a diagrammatic representation of apparatus embodying the present invention for inspecting electric cable;

FIGURE 2 is a diagrammatic representation of a modified form of the apparatus of FIG. 1.

Figure 3:
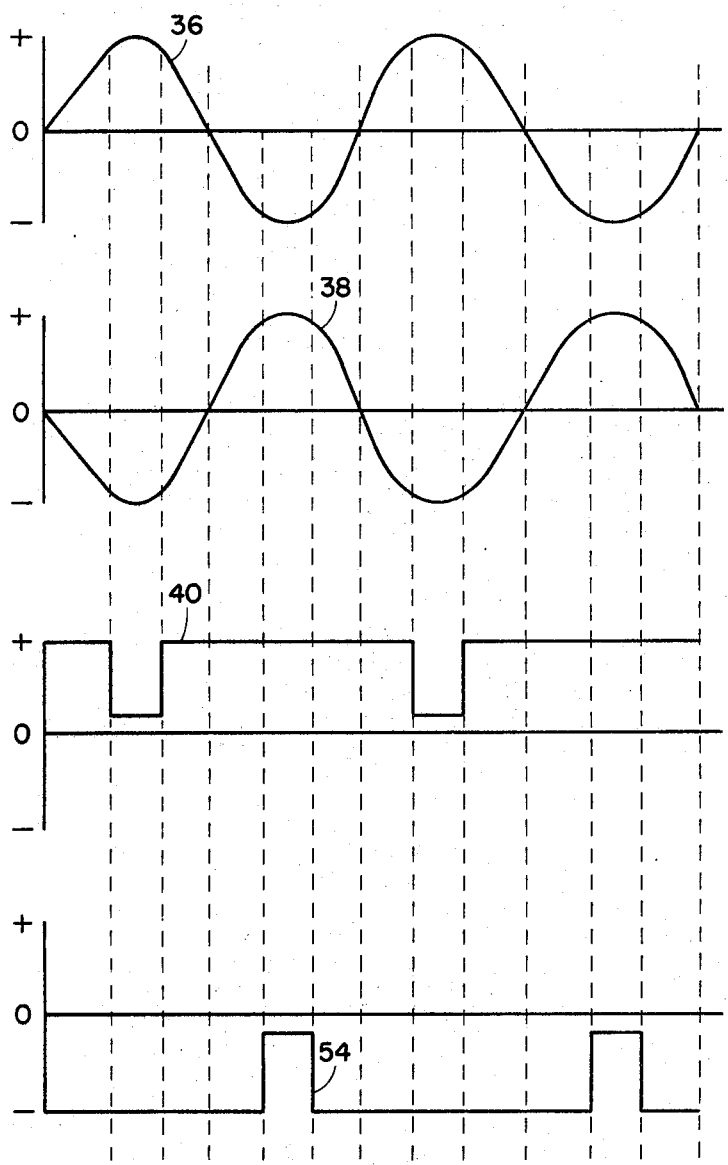
FIGURE 3 is a diagrammatic representation of the electrical signals passing through the apparatus of FIG. 1.

In that form of the present invention chosen for purposes of illustration in FIG. 1, a source 2 of high, alternating voltage is connected to a conductor 4 internal to a cable 6 which is being inspected, and to an electrode 8, such as the cable sheath, external to the cable 6. At the same time, source 2 applies an alternating, electrical signal through a suitable conductor 10 to a phase shifting circuit 12; and, thence, through conductor 14 to a phase splitting circuit 16. From the phase splitting circuit 16, the electrical signal is supplied to a multivibrator 18. The multivibrator 18 converts the signals from the phase splitting circuit 16 to rectangular wave signals having a repetition rate which is substantially equal to that of the signal applied by source 2 to the cable 6. The output of the multivibrator 18 is supplied, via conductors 20 and 22, to a switching circuit 24 and, thence, to a suitable corona detector 26 which is positioned to detect corona discharge occurring within the cable 6. Finally, the signals from multivibrator 18 are passed via conductors 20 and 28 to the control grid of a grid-controlled, X-ray source 30.

It has long been known that defects contained in an electric cable 6 could be detected by applying a strong, alternating voltage between a conductor 4 internal to the cable 6 and an external electrode 8. This stressing voltage may be of sufficient magnitude to cause discharge of the electrons in dielectric discontinuities contained in the cable 6, which results in emission of corona discharge. Alternatively, the stressing voltage may have a value which is sufficient to cause separation of charge; but, which is insufficient to cause corona discharge. Subsequently, each portion of the cable 6 is exposed to highly penetrating radiation; either by maintaining the radiation source 30, at a fixed position while the cable 6 is moved past the radiation source 30, or vice versa. Apparatus for accomplishing these techniques are found in U.S. Patent No. 2,794,168 and U.S. Patent No. 2,794,169, issued simultaneously to Mr. Francis H. Gooding on May 28, 1957, and assigned to The Okonite Company, Passaic, N. J., and in my aforementioned copending application.

In use, a stressing voltage from alternating voltage supply 2 is applied between a conductor 4, internal to the cable 6, and an electrode 8, external to the cable 6, to subject the insulation of the cable 6 to a stressing voltage. The magnitude of the stressing voltage which is applied to the cable 6 preferably is sufficient to cause ionization of any defect in the insulation and may or may not be above the corona inception level. Where the magnitude of the stressing voltage is insufficient to cause discharge of the ionization in the cable defects, a source 30 of highly penetrating radiation may be employed to irradiate the cable 6 with periodic bursts of such radiation to cause discharge of the ionization in the cable defects with the associated corona discharge. It can easily be shown that corona discharge is most likely to occur when the stressing voltage is approximately at its peak value, or, when a pulsed source 30 of highly-penetrating radiation is employed, during the interval when the radiation source is emitting radiation. Thus, if such a radiation source 30 is employed, it would be desirable to synchronize the radiation source 30 with the stressing voltage source 2 so that the pulses of radiation will be coincident in time with the peaks of the stressing voltage. Moreover, as noted above, operation of electrical equipment, sparking, and other electrical phenomena, occurring in the vicinity of the inspection operation, induce electrical noise signals in the cable 6. However, these induced noise signals occur at random times whereas, as discussed previously, corona discharge is most likely to occur when the stressing votage is approximately at its peak value or during an interval of irradiation by the source 30. Consequently, it is desirable to synchronize the detector 26 with the stressing voltage source 2 to cause the detector 26 to detect corona signals only during time intervals coinciding in time with the peaks of the stressing voltage. In this way, the vast majority of the induced noise signals are not detected by the detector 26 and the signal-to-noise ratio of the output of detector 26 is greatly improved.

To accomplish this, the stressing voltage source 2 is connected to the conductor 4 and sheath 8 of the cable 6 by leads 32 and 34. At the same time, the stressing voltage source 2 applies an alternating voltage signal to lead 10 which supplies the signal to the phase shifter 12. This signal is represented by the curve 36 in FIG. 3. The phase shifter 12 shifts the phase of the signal from stressing voltage source 2 through 180 degrees, and passes the inverted signal via lead 14 to the phase splitter 16, in substantially the form represented by curve 38 in FIG. 3. The phase splitter 16 passes only the negative half-cycles of the signal represented by curve 38 to the multivibrator 18, while the positive half-cycles are shunted to ground or may be employed for other purposes. Upon receipt of the signals from phase splitter 16, the multivibrator 18 converts the signals into rectangular signals, represented by the curve 40 of FIG. 3, and supplies these rectangular signals through leads 20 and 22 to switching circuit 24. Comparing curves 36 and 40 of FIG. 3, it will be seen that the signal corresponding to curve 40 is normally strongly positive, but drops sharply to a weakly positive value each time that curve 36 approaches a positive peak. Also, curve 40 rises sharply to its strongly positive value each time curve 36 passes a positive peak. Switching circuit 24 is responsive to the signal from multivibrator 18, corresponding to curve 40, and acts to energize detector 26 when curve 40 drops from its high value to its lower value, and to deenergize detector 26 when curve 40 rises to its high value. Thus, detector 26 is operative only when the stressing voltage applied to the cable 6 is approximately at its maximum value, as indicated above, corona discharge can occur within the cable 6 only when the stressing voltage is approximately at its maximum value, whereas electrical noise can occur at any time. By gating the detector 26 in the manner described above, detector 26 will be operative only during that portion of the stressing voltage cycle in which corona discharge is likely to occur, and will be inoperative at all other times. Consequently electrical noise signals occuring during other portions of the stressing voltage cycle will not be detected. As a result, the signal-to-noise ratio of the signals detected by detector 26 will be greatly improved. Moreover, where a pulsed source 30 of highly penetrating radiation is employed, multivibrator 18 may be connected to the source 30, as by leads 20 and 28, to supply signals to source 30 corresponding to curve 40 of FIG. 3 to control the timing of the bursts of radiation. This causes the radiation bursts to be synchronized with the peaks of the stressing voltage and with the operation of the detector 26. Hence, detector 26 is operative only during periods of irradiation of the cable 6 by source 30. As indicated above, this is the period when corona discharge is most likely to occur. Therefore, the random noise signals are eliminated from the detector 26 and the signal-to-noise ratio of detector 26 is greatly improved.

FIG. 2 shows a modified form of the invention which makes it possible to distinguish and separately measure the relative effects of corona discharge caused by the stressing voltage from that caused by the highly penetrating radiation. In this form of the invention, a source 2 of high, alternating voltage is connected between a conductor 4 internal to the cable 6 to be inspected and an electrode 8, such as the cable sheath, external to the cable 6 to apply a stressing voltage to the cable 6. The stressing voltage will have a wave form corresponding to curve 36 of FIG. 3. At the same time, source 2 applies a signal, corresponding to curve 36 of FIG. 3, through lead 42 to a suitable phase shifter circuit 44. The phase shifter 44 has two outputs 46 and 48 and supplies the signal from source 2 to output 46 with the phase unchanged. This signal corresponds with curve 36 of FIG. 3. Simultaneously, phase shifter 44 shifts the phase of the signal from source 2 through 180 degrees, corresponding with curve 38 of FIG. 3, and supplies the inverted signal to output 48. Diode 50 is connected to output 46 and acts to block the positive portions of the signal from source 2 and to pass the negative portions of the signal to a multivibrator 52. Multivibrator 52 converts the negative portions of the signal into rectangular wave signals, corresponding to curve 54 of FIG. 3 and supplies these signals to switch 56. Switch 56 controls the energization of a first corona detector 58. Detector 58 is positioned to detect corona discharge occurring in cable 6 and provides a signal indicative of detected corona discharge to a suitable display means, such as recorder 60. Meanwhile, a second diode 62 is connected to output 48 of phase shifter 44 and acts to block the positive portions of the signal from source 2 and to pass the negative portions of the signal to multivibrator 64. Multivibrator 64 converts the negative portions of the signal into rectangular wave signals, corresponding to curve 40 of FIG. 3 and supplies these signals to the source 30 of highly penetrating radiation and to a switch 66 which controls energization of a second detector 68. Detector 68 is also positioned to detect corona discharge occurring in the cable 6 and provides a signal indicative of detected corona discharge to the recorder 60.

The operation of this form of the invention is best understood by reference to FIGS. 2 and 3. As shown in FIG. 3 and described above, the source 2 applies an alternating voltage, corresponding to curve 36, to stress the cable 6. At the same time, source 2 passes this same signal to phase shifter 44 which supplies the signal, unchanged, to diode 50 and, in inverted form, to diode 62. Diode 62 blocks the positive portion of the inverted signal and passes the negative portion to multivibrator 64 which converts the negative portion into a positive, rectangular wave, corresponding to curve 40 of FIG. 3, and applies this positive, rectangular wave to trigger the radiation source 30 and detector 68. Hence, it will be seen that irradiation of the cable 6 by the source 30 and detection of corona discharge resulting therefrom by detector 68 are both synchronized to coincide with the positive peaks of the stressing voltage applied to the cable 6 by the alternating voltage source 2. Meanwhile, diode 50 blocks the positive portion of the unchanged signal from source 2 and passes the negative portion into a negative, rectangular wave, corresponding to curve 54 of FIG. 3, and applies this negative, rectangular wave to trigger detector 58. Thus, activation of detector 58 is synchronized to coincide with the negative peaks of the stressing voltage applied to the cable 6 by the alternating voltage source 2. As described above, corona discharge is most likely to occur in the cable 6 when the stressing voltage applied by alternating voltage source 2 is at its peak value. This will be equally true for positive and negative peak values of the stressing voltage. Accordingy, by synchronizing detector 58 to detect corona discharge occurring in the cable 6 at negative peaks of the stressing voltage of voltage source 2; and by causing irradiation of the cable 6 by radiation source 30 and detection by detector 68 of the corona discharge resulting therefrom to be synchronized with the positive peaks of the stressing voltage of voltage source 2, it becomes possible to separately detect and compare the stressing voltage induced corona discharge with the radiation induced corona discharge. It has been found that analysis of the results of such a comparison yields information concerning the size, shape, and composition of the dielectric discontinuity in which the corona discharge occurred. This information has not been obtainable with prior art cable scanning techniques.

Obviously, numerous other variations and modifications may be made without departing from the present invention. Accordingly, it should be clearly understood that the forms of the invention described above and shown in the figures of the accompanying drawing are illustrative only and are not intended to limit the scope of the present invention.

What is claimed is:

1. The method of inspecting electric cable for discontinuities in the insulation thereof comprising the steps of:
applying an alternating voltage between a conductor internal to a cable to be inspected and an electrode external to said cable to cause ionization to occur in dielectric discontinuities contained in the insulation of said cable, and
detecting corona discharge occurring in said cable insulation only during intervals when said alternating voltage is approximately at a peak value.

2. The method of claim 1 comprising the further step of:
irradiating said cable with highly penetrating radiation only during said intervals when said alternating voltage is approximately at a peak value.

3. The method of claim 1 wherein:
said detecting step is performed only during intervals when said alternating voltage is approximately at peak values of like polarity.

4. The method of claim 1 wherein:
said detecting step is performed only during positive half-cycles of said alternating voltage.

5. The method of claim 2 wherein:
said detecting step is performed only during intervals when said alternating voltage is approximately at peak values of like polarity.

6. The method of claim 2 wherein:
said irradiating step is performed only during intervals when said alternating voltage is approximately at peak values of like polarity.

7. The method of claim 6 wherein:
said detecting step is performed during intervals when said alternating voltage is approximately at peak values of either polarity.

8. The method of claim 7 comprising the further steps of:
providing an indication of corona discharge detected during intervals when said alternating voltage is approximately at peak values of a first polarity, and
providing a separate indication of corona discharge detected during intervals when said alternating voltage is approximately at peak values of a second polarity.

9. Apparatus for inspecting electric cable for discontinuities in the insulation thereof comprising an electrode adapted to be placed externally to a cable to be inspected:
voltage source means for applying an alternating voltage between a conductor internal to said cable to be inspected and said electrode external to said cable to cause ionization to occur in dielectric discontinuities contained in said cable, and
detector means connected to said electrode and synchronized with said voltage source means for detecting corona discharge occurring in said cable and operable only during intervals when said alternating voltage is approximately at a peak value.

10. The apparatus of claim 9 further comprising:
radiation source means for irradiating said cable with highly penetrating radiation only during said intervals when said alternating voltage is approximately at a peak value.

11. The apparatus of claim 9 further comprising:
means for energizing said detector means only during intervals when said alternating voltage is approximately at peak values of like polarity.

12. The apparatus of claim 9 further comprising:
means for energizing said detector means only during positive half-cycles of said alternating voltage.

13. The apparatus of claim 10 further comprising:
means for energizing said detector means only during intervals when said alternating voltage is approximately at peak values of like polarity.

14. The apparatus of claim 10 further comprising:
means for causing said radiation source means to irradiate said cable only during intervals when said alternating voltage is approximately at peak values of like polarity.

15. The apparatus of claim 14 further comprising:
means for energizing said detector means during intervals when said alternating voltage is approximately at peak values of either polarity.

16. The apparatus of claim 15 further comprising:
means for providing an indication of corona discharge detected during intervals when said alternating voltage is approximately at peak values of a first polarity, and
means for providing a separate indication of corona discharge detected during intervals when said alternating voltage is approximately at peak values of a second polarity.

17. The apparatus of claim 10 wherein:
said radiation source means comprises a grid-controlled X-ray source,
phase splitting means connected to receive said alternating voltage from said voltage source means and to pass only those portions of said alternating voltage which are of a given polarity,
multivibrator means connected to receive said portions of said alternating voltage passed by said phase splitting means and to convert said portions to a rectangular wave signal, and means connected to receive said rectangular wave signal and to apply said rectangular wave signal to the control grid of said grid-controlled X-ray source for controlling activation of said X-ray source.

18. The apparatus of claim 17 further comprising:

means connected to receive said rectangular wave signal and to apply said rectangular wave signal to said detector means to cause said detector means to be operative only during intervals when said X-ray source is activated.

19. The apparatus of claim 18 further comprising:

a second multivibrator connected to receive portions of said alternating voltage of opposite polarity to said given polarity and to convert said portions of opposite polarity to a second rectangular wave signal, and a second detector means connected to be energized by said second rectangular wave signal for detecting corona discharge occurring in said cable only during intervals when said radiation source means is unactivated and said alternating voltage is approximately at a peak value.

References Cited

UNITED STATES PATENTS

| 2,937,336 | 5/1960 | Gooding | 324—54 |
| 2,942,188 | 6/1960 | Mitchell | 324—121 X |
| 3,015,774 | 1/1962 | Eigen | 324—54 |

RUDOLPH V. ROLINEC, *Primary Examiner.*

G. R. STRECKER, *Assistant Examiner.*

UNITED STATES PATENT OFFICE
CERTIFICATE OF CORRECTION

Patent No. 3,421,076                                  January 7, 1969

David Eigen

It is certified that error appears in the above identified patent and that said Letters Patent are hereby corrected as shown below:

Column 6, line 21, "comprising" should read -- comprising: --; same line 21, "an" should start a new paragraph; same column 6, line 22, "inspected:" should read -- inspected, --.

Signed and sealed this 31st day of March 1970.

(SEAL)
Attest:

Edward M. Fletcher, Jr.                        WILLIAM E. SCHUYLER, JR.
Attesting Officer                                   Commissioner of Patents